(12) United States Patent
Clayton et al.

(10) Patent No.: US 7,105,205 B2
(45) Date of Patent: Sep. 12, 2006

(54) DENSIFICATION OF THERMAL SPRAY COATINGS

(75) Inventors: Clive Clayton, East Setauket, NY (US); Herbert Herman, Port Jefferson, NY (US); Henry White, Nesconset, NY (US)

(73) Assignee: Research Foundation of the State of New York, Stony Brook, NY (US)

( * ) Notice: Subject to any disclaimer, the term of this patent is extended or adjusted under 35 U.S.C. 154(b) by 0 days.

(21) Appl. No.: 10/811,610

(22) Filed: Mar. 29, 2004

(65) Prior Publication Data
US 2004/0265503 A1 Dec. 30, 2004

Related U.S. Application Data

(60) Provisional application No. 60/458,724, filed on Mar. 28, 2003.

(51) Int. Cl.
C23C 4/18 (2006.01)
B23K 20/12 (2006.01)
B29C 65/06 (2006.01)

(52) U.S. Cl. ............ 427/446; 427/447; 427/450; 427/451; 427/453; 427/454; 427/455; 427/449; 427/456; 156/733.5; 228/112.1

(58) Field of Classification Search ............ 427/446, 427/449, 453, 450, 451, 455, 456, 447; 228/112.1
See application file for complete search history.

(56) References Cited

U.S. PATENT DOCUMENTS 4,157,923 A * 6/1979 Yen et al. ............ 148/512
6,113,991 A * 9/2000 Salito ............ 427/455
6,227,435 B1 * 5/2001 Lazarz et al. ............ 228/125
2003/0012678 A1 * 1/2003 Sherman ............ 419/66
2003/0042291 A1 * 3/2003 Mahoney ............ 228/112.1

OTHER PUBLICATIONS

John A. Wert, *Microstructures of Friction Stir Weld Joints between an Aluminum-base Metal Matrix Composite and a Monolithic Aluminum Alloy*, Scripta Materialia, 49 (2003) pp. 607-612.
K. Colligan, *Material Flow Behavior during Friction Stir Welding of Aluminum*, Supplement to the Welding Journal, Jul. 1999, pp. 229s-237s.
M. Guerra et al., *Flow Patterns during Friction Stir Welding*, Materials Characterization, 39 (2003), pp. 95-101.
J.H. Ouyang et al., *Material Flow and Microstructure in the Friction Stir Butt Welds of the Same and Dissimilar Aluminum Alloys*, Journal of Materials Engineering and Performance, vol. 11(1), Feb. 2002, pp. 51-63.
T.U. Seidel et al., *Visualization of the Material Flow in AA2195 Friction-Stir Welds Using a Marker Insert Technique*, Metallurgical and Materials Transactions, vol. 32A, Nov. 2001, pp. 2879-2884.
K.N. Krishnan, *On the Formation of Onion Rings in Friction Stir Welds*, Materials Science and Engineering, Materials Science and Engineering, A327 (2002), pp. 246-251.

(Continued)

*Primary Examiner*—Katherine Bareford
(74) *Attorney, Agent, or Firm*—F. Chau & Associates, LLC

(57) ABSTRACT

A thermal spray mixed with a substrate using a non-consumable cylindrical rotating tool. The process may be repeated to create a composite-like coating or material. The coating or material may be machine to improve surface quality.

11 Claims, 7 Drawing Sheets

OTHER PUBLICATIONS

W.B. Lee et al., *The Mechanical Properties Related to the Dominant Microstructure in the Weld Zone of Dissimilar formed Al Alloy Joints by Friction Stir Welding*, Journal of Materials Science, 38 (2003) pp. 4183-4191.

Henry J. White, *Deformation During Friction Stir Welding*, 2001 NASA/ASEE Summer Faculty Fellowship Program, Marshall Space Flight Center—The University of Alabama in Huntsville.

Takeshi Shinoda et al., *Proposals of Novel Surface Modification Technology using Friction Stir Welding Phenomenon*, Materials Science Forum, vols. 426-432 (2003), pp. 2837-2842.

T. Nishihara, *Development of Friction Stir Forming*, Materials Science Forum, vols. 426-432 (2003), pp. 2971-2978.

R.S. Mishra et al., *Friction Stir Processing: A Novel Technique for Fabrication of Surface Composite*, Materials Science and Engineering, A341 (2003) pp. 307-310.

Matt Collier et al., *Grade Development of Polycrystalline Cubic Boron Nitride for Friction Stir Processing of Ferrous Alloys*, Materials Science Forum, vols. 426-432 (2003), pp. 3011-3016.

S.P. Lynch et al., *Friction-Stir Processing of a High-Damping Mn-Cu Alloy used for Marine Propellers*, Materials Science Forum, vols. 426-432 (2003), pp. 2903-2908.

William A. Palko et al., *Investigation of the Use of Friction Stir Processing to Repair and Locally Enhance the Properties of Large Ni Al Bronze Propellers*, Materials Science Forum, vols. 426-432 (2003), pp. 2909-2914.

K. Oh-ishi et al., *The Influence of Friction Stir Processing on Microstructure and Properties of a Cast Nickel Aluminum Bronze Material*, Materials Science Forum, vols. 426-432 (2003), pp. 2885-2890.

Z.Y. Ma et al., *Microstructural Modification of Cast Aluminum Alloys Via Friction Stir Processing*, Materials Science Forum, vols. 426-432 (2003), pp. 2891-2896.

* cited by examiner

FIGURE 6B

DENSIFICATION OF THERMAL SPRAY COATINGS

CROSS-REFERENCE TO RELATED APPLICATION

This application claims the benefit of U.S. Provisional Application Ser. No. 60/458,724, filed Mar. 28, 2003.

BACKGROUND OF THE INVENTION

1. Field of the Invention

The present invention relates to a system and method for processing materials, and more particularly to a system and method for densification of a thermal spray coating deposited on a substrate material.

2. Discussion of Related Art

Friction stir welding (FSW) is a welding technique invented by The Welding Institute (TWI) in 1991. FSW is a solid-state joining process that is a combination of extruding and forging. FSW works at a temperature below the melting point of the work piece material.

Referring to FIGS. 1A and 1B, FSW uses a cylindrical, shouldered tool 101 that is rotated and plunged into a joint line 102 between two pieces of sheet or plate material 103–104, which are butted together. The tool 101 comprises a nib 105 and is constructed from a suitable material, e.g., having suitable thermochemical stability, hot hardness, and abrasion resistance. Frictional heat is generated between the tool 101 and the pieces of work material 103–104. This heat causes the work piece material to soften and allows the tool 101 to traverse the joint line 102, wherein the plasticized work material is transferred from a leading edge 106 of the tool 101 to the trailing edge 107 of the tool shoulder and nib. The tool 101 creates a solid phase bond 108 between the two pieces of work material 103–104.

During welding, three flow fields may exist: a primary rotational flow field due to the rotating sliver of material surrounding the nib; a secondary translational flow field created as a sliver of metal entrained in the threaded nib traverses the substrate; and a tertiary vortex field forming smoke rings adjacent to the sliver of entrained metal as a result of the primary and secondary flow fields. This model helps to explain the intercalated, lamellar, or onion-like structures of a friction stir weld. The normal force (Force$_{plunge}$=6ΠRτ(T); where R is the radius of the shoulder and τ is the temperature dependent shear flow stress) and the moment (Power=2ΠR2tτ(T)ω; where R is the shoulder radius, t is the plate thickness, τ is the temperature dependent shear flow stress, and ω is the angular velocity of the weld tool=2Π(rpm)/60) needed for welding and translational forces (Force$_{Translational}$=12Rtτ(T), where R is the shoulder radius, t is the plate thickness, and τ is the temperature dependent shear flow stress) produced during welding can be estimated.

Since its invention, FSW has emerged as an important solid state joining process for applications in industries including aerospace, shipping, railway, as well as military.

Thermal spray is a directed spray process in which material in molten form, semi-molten, or solid form, is accelerated to high velocities, and impinged upon a substrate, where a dense and strongly adhered deposit is built. Material may be injected in the form of a powder, wire or rod into a high velocity combustion or thermal plasma flame, which imparts thermal and momentum transfer to the particles. By carefully controlling the plume characteristics and material state, it is possible to deposit a vast range of materials (e.g., metals, ceramics, polymers and combinations thereof) onto virtually any substrate in various conformal shapes. For metals, the particles can be deposited in solid or semi-solid state. For ceramic deposits, the particles may need to be well above the melting point, which is achieved by either a combustion flame or a thermal plasma arc. The deposit is built-up by successive impingement of droplets, which yield flattened, solidified platelets, referred to as 'splats'. The deposited microstructure and, thus, properties, aside from being dependent on the spray material, depend on the processing parameters, which can be numerous and complex.

However, no know system or method exists for processing a thermal spray coating using friction stir welding. Therefore, a need exists for a system and method for processing a thermal spray coating and a substrate by friction stir welding.

SUMMARY OF THE INVENTION

In thermal spray, metallic or nonmetallic surfacing materials are deposited in a molten or semi-molten condition on a substrate. In this process the feedstock, in the form of a wire, rod, cord or powder, is heated to its plastic or molten state by an oxy-fuel flame, electric arc, plasma or by detonation of an explosive gas mixture. The hot material is propelled from a spray gun to the substrate in a gas stream. The bond (e.g., mechanical, chemical, metallurgical, or a combination of these) between the substrate and the coating material is stirred using a consumable or non-consumable rotating tool, creating a composite material.

According to an embodiment of the present disclosure, a method for densification of a thermal spray coating comprises depositing a thermal spray coating on a substrate, and mixing the thermal spray coating and the substrate by friction stir welding.

The mixing causes metal flow of the thermal spray coating to a depth controlled by a nib of a weld tool into the substrate.

The thermal spray coating is deposited by as a plasma spray. The thermal spray coating is deposited by oxy-fuel combustion acceleration of a powder feedstock. The thermal spray coating is deposited by two-wire electric arc spray.

The substrate is a ferrous alloy. The substrate is a non-ferrous alloy.

The thermal spray coating is a ceramic, a carbide, a metal, a composite, or a plastic.

The method comprises determining a time between depositing the thermal spray coating and the friction stir welding according to a distance between a spray gun of a thermal spray system and a tool of a friction stir welding system and a speed of the substrate relative to the spray gun and tool.

According to an embodiment of the present disclosure, a system for densification of a thermal spray coating comprises a first thermal spray gun for depositing a first coating on a substrate, and a densification tool for mixing the coating and the substrate.

The densification tool is housed in a protective tube. The tube is ceramic.

The system comprises a second thermal spray gun. The first thermal spray gun applies the first coating before mixing and the second thermal spray gun applies a second coating after mixing.

The first thermal spray gun and the densification tool are fixed relative to one another, and are moveable relative to the substrate.

BRIEF DESCRIPTION OF THE DRAWINGS

Preferred embodiments of the present invention will be described below in more detail, with reference to the accompanying drawings:

FIGS. 6A and 6B are diagrams of apparatus according to an embodiment of the present disclosure.

DETAILED DESCRIPTION OF PREFERRED EMBODIMENTS

Figure 1A:
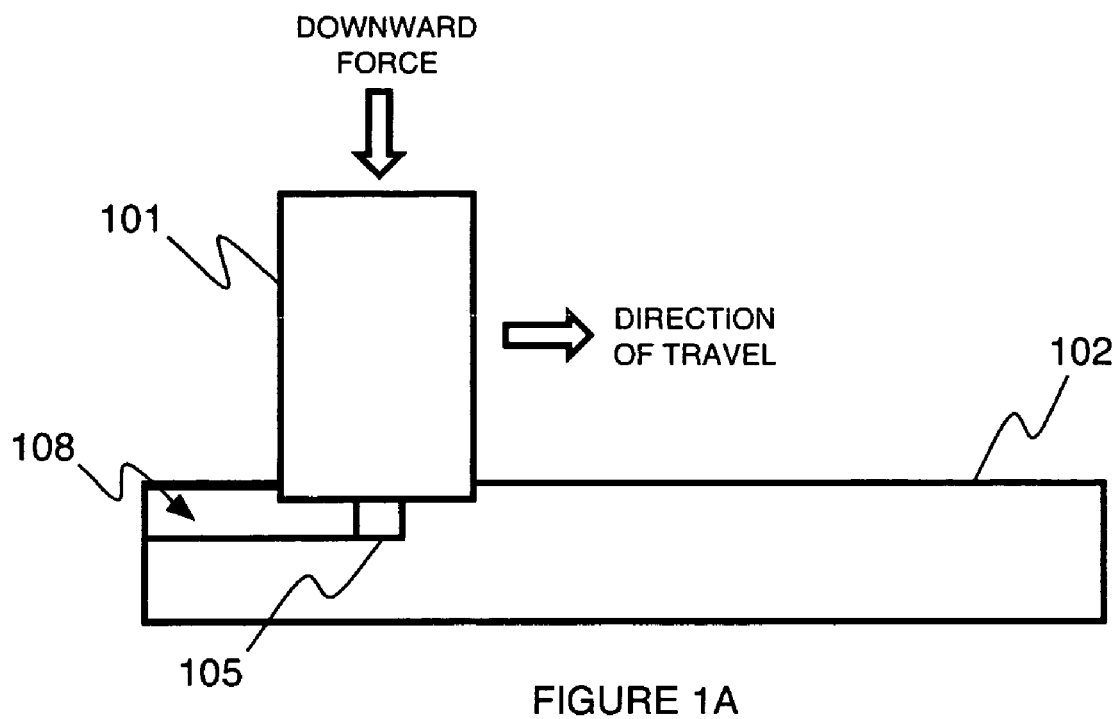
FIG. 1A is a diagram of a cut-away view of a friction stir weld and tool.
Figure 1B:
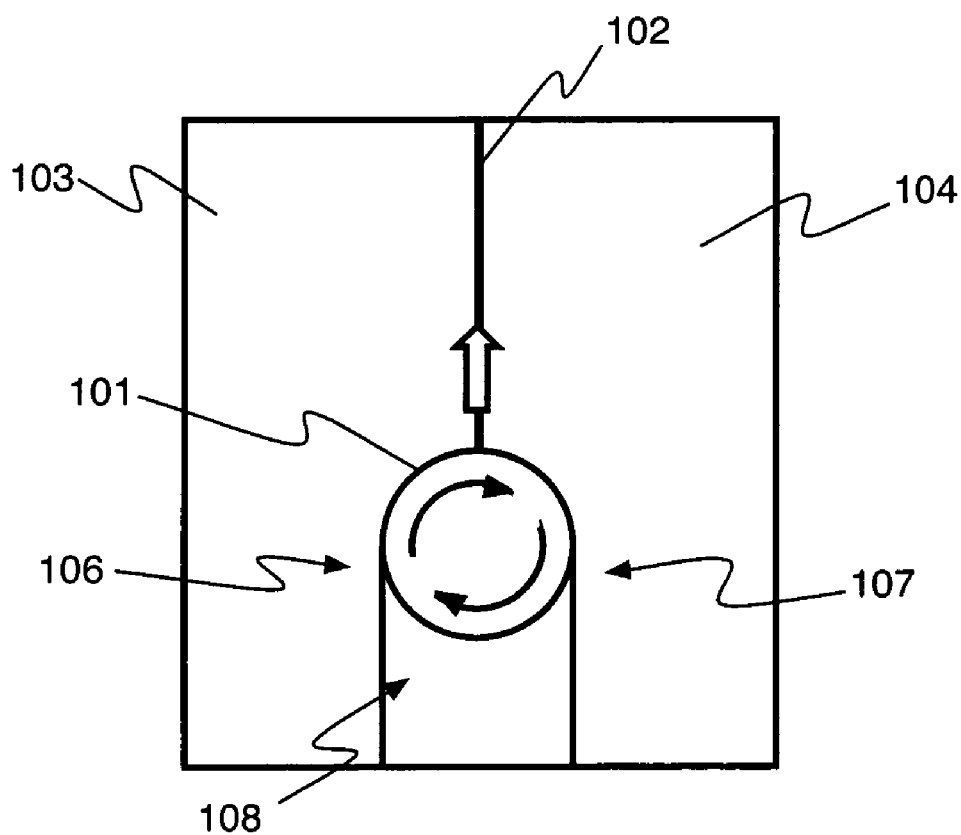
FIG. 1B is a top-down view of a friction stir weld and tool.
Figure 2:
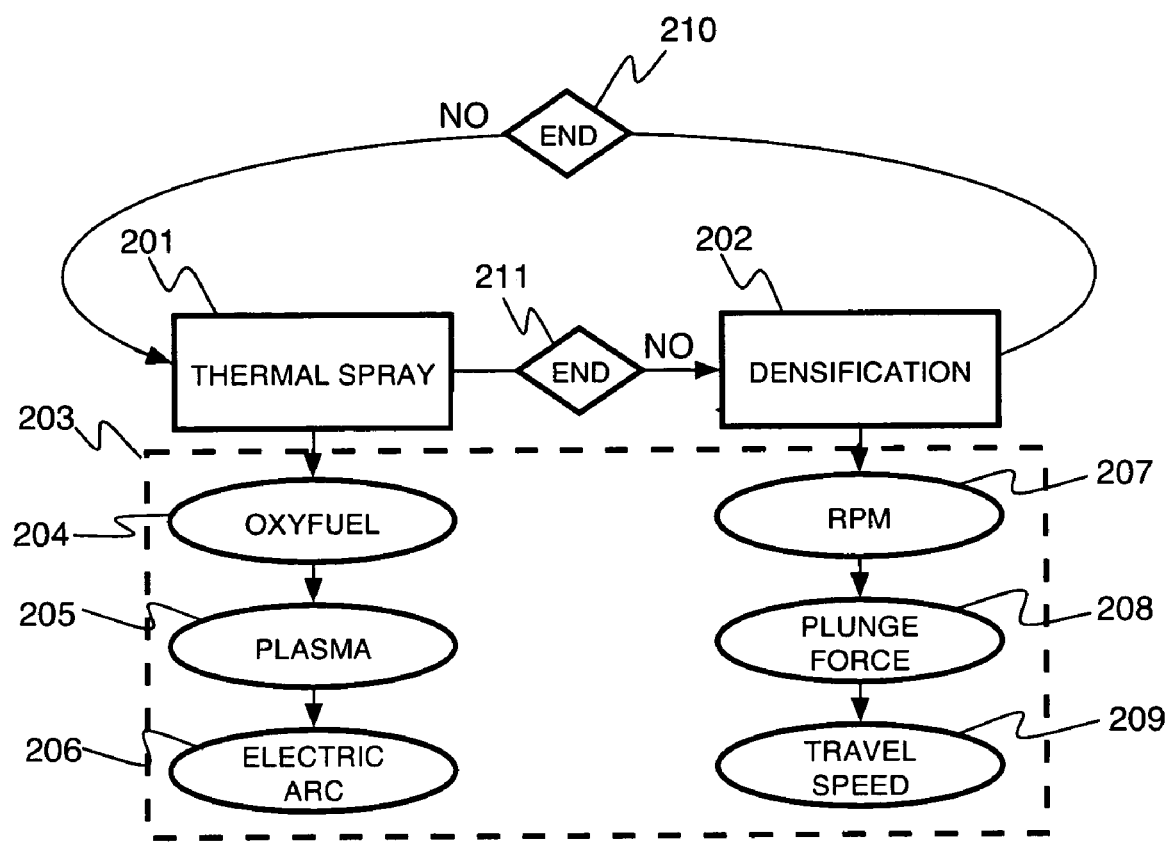
FIG. 2 is a diagram of an apparatus according to an embodiment of the present disclosure.
Figure 3:
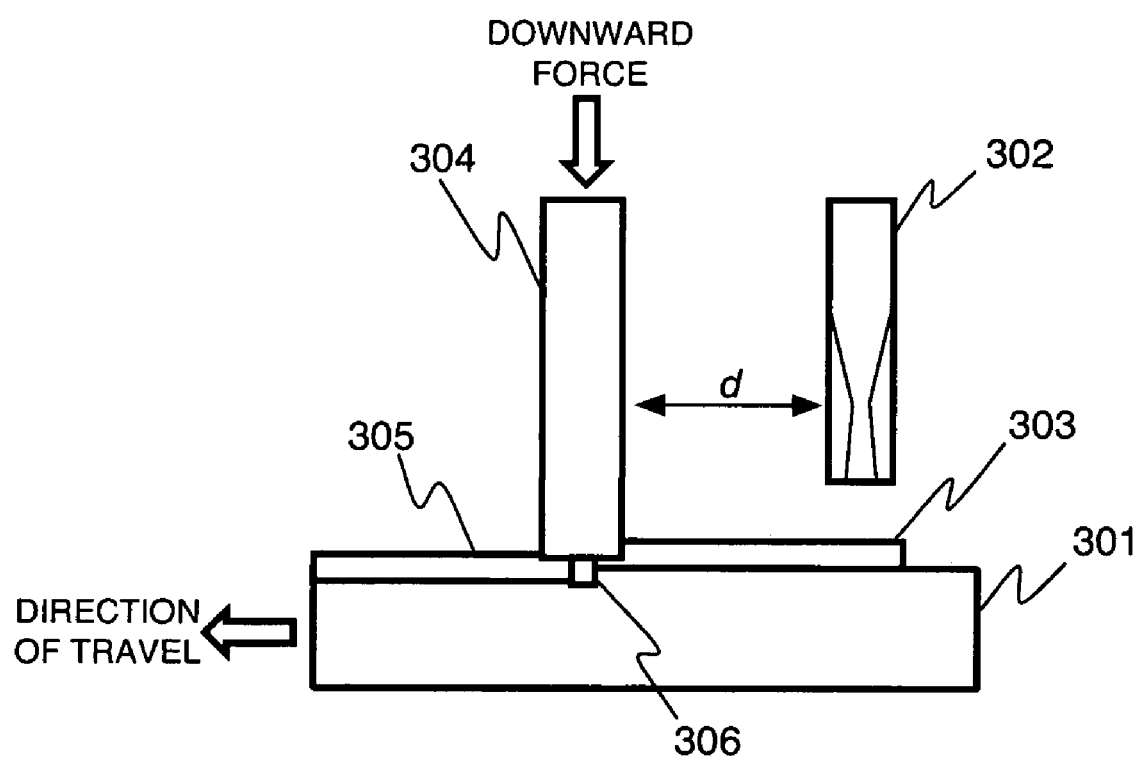
FIG. 3 is a diagram of an apparatus according to an embodiment of the present disclosure.

Composite materials may be created by friction stir welding a thermal spray coating and a substrate. Referring to FIG. 2, a thermal spray is deposited on a substrate 201. The thermal spray and substrate are processed by a friction stir welding tool 202. Process variations are shown in 203, wherein the thermal spray coating may be deposited by oxy-fuel 204, plasma 205, or an electric arc 206. Process variations for the densification include rotational speed 207, plunge force 208 of the tool into the substrate and thermal spray, and travel speed 209 of the tool relative to the substrate, or vise versa. The process may repeat, wherein an end point 210 or 211 may be determined after an initial thermal spray 201 and densification process 202.

A metallic or nonmetallic surfacing material is deposited in a molten or semi-molten condition on a substrate 301. A thermal spray gun 302 deposits the surfacing material as a coating 303 on the substrate 201. A thermal spray feedstock, in the form of a wire, rod, cord or powder, is heated to its plastic or molten state by an oxy-fuel flame, electric arc, plasma, or by detonation of an explosive gas mixture. The hot surfacing material is propelled at a velocity, e.g., about less than 3000 ft/sec, from the thermal spray gun 302 to the substrate 303 in a gas stream. The initial bond between the substrate 301 and the coating material 303 may be mechanical, chemical, metallurgical, or a combination of these. The thickness of the coating material 303 may be between about one tenth and several tens of millimeters thick. The coating material is stirred using a non-consumable rotating tool 304, creating a composite material 305. The process may improve wear resistance, corrosion resistance, electrical, physical, and mechanical properties of the substrate material 301 depending on the characteristics of the thermal spray coating 303.

A time between depositing the thermal spray coating and mixing the coating and substrate may be controlled by a distance, d, between the thermal spray gun 302 and the tool 304 of the friction stir welding device. Another variable for controlled the time between depositing the thermal spray coating and mixing the coating and substrate is the speed of the substrate relative to the spray gun and tool, or vise versa. The speed may need to be set according to the properties, e.g., hardness, of the substrate material or tool.

A process for densification of thermal spray coatings (DTSC) can be employed to admix a thermal sprayed coating into a substrate, producing a monolithic or surface-based composite material having two or more inter-dispersed phases, comprising the sprayed material and a substrate. The depth of the tool 304, including a nib 306, controls whether the composite is monolithic or surface-based. Terms such as surface alloying, friction stir welding/surfacing filler material addition, coating, cladding, or buttering may be used to further describe DTSC.

DTSC conveys thermal energy to a metal surface to the extent that metal flow occurs and mixes the thermal sprayed coating 303 to a depth controlled by the nib 306 of the tool 304 inserted into the substrate 301 producing a dispersion-strengthened microstructure. The DTSC may affect an improvement of a variety of technological properties, including mechanical properties.

Thermal spray technology, employing plasma spray (e.g., using a non-transferred arc as the source of heat to ionize gas, wherein a plasma flame melts and propels a powder feedstock to the substrate), oxy-fuel combustion (e.g., feedstock powder is melted in an oxy-fuel flame to form a fine spray) or two-wire electric arc spray technology (e.g., two wires arc two consumable electrodes and a compressed gas to atomize and propel a metallic wire feedstock surfacing material to the substrate) are employed to apply a metallic coating. Thermal spray techniques are well known in the art. DTSC then energetically/mechanically mixes the sprayed coating into the substrate to a depth controlled by the depth of the nib 306.

Friction stir processing (welding/surfacing) techniques are well known. For DTSC, the tool 304 rotates at about several hundred to over several hundred thousand revolutions per minute (RPMs). The travel speed of the tool relative to the substrate is similar to a conventional welding process and is dependent on the RPMs and loading. The normal loading, or downward force, is dependant on the temperature dependant shear stress and the geometry of the tool. The tool material may depend on the application and can be a variety of heat-treated steels, ceramic, and composite materials.

The surfacing or coating material 303 may be a ferrous or non-ferrous alloy, ceramic, composite material, or polymer. The substrate material 301 can be a variety of polymers, composite materials, ferrous and non-ferrous alloys, and aluminum alloys. DTSC can improve the surface strength of commercial aluminum alloys, increasing the utility of aluminum alloys.

Figure 4:
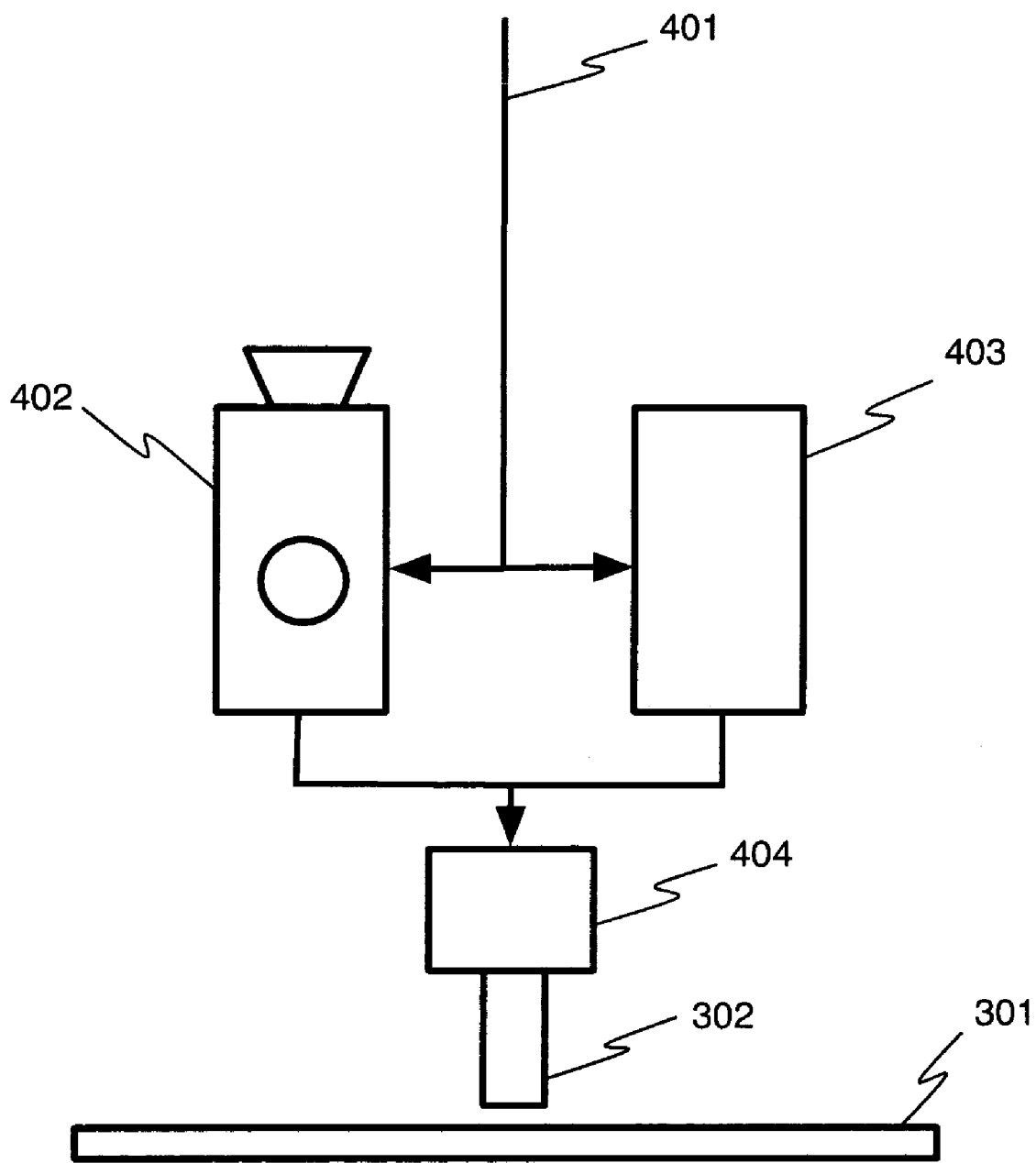
FIG. 4 is a diagram of a thermal spray apparatus according to an embodiment of the present disclosure.

Referring to FIG. 4, depicting an example of a thermal spray system, a gas line 401 provides pressurized gas to a material feeder 402 and an accelerant supply 403. The accelerant supply 403 provides an accelerant such as Helium, Argon, Air, Hydrogen, and Nitrogen. The material from the feeder 402 and the accelerant from the heater 403 are combined in at a mixing head 404 comprising a tube 302. The material is ejected from the tube and deposited on a substrate 301. The mixing head 404 and tube 302 can be connected to a programmable robotic arm. In addition, the friction stir welding tool may be connected to the arm such that the tool 304 and spray gun (e.g., 404 and 302) move in unison. Similarly, the substrate 301 can be positioned on a programmable stage. Thus, the substrate and or system can be moved in relation to one another to produce a feature such as a line.

According to an embodiment of the present invention, the initial bond (mechanical, chemical, metallurgical, or a combination of these) between the substrate and the coating is stirred (e.g., churned briskly, agitated) using a non-consumable rotating tool 304/306. The process may improve wear resistance, corrosion resistance, and electrical, physical, and mechanical properties of material depending on a characteristic of the coating. For example, a stainless steel coating may increase a substrate's resistance to corrosion.

Figure 5:
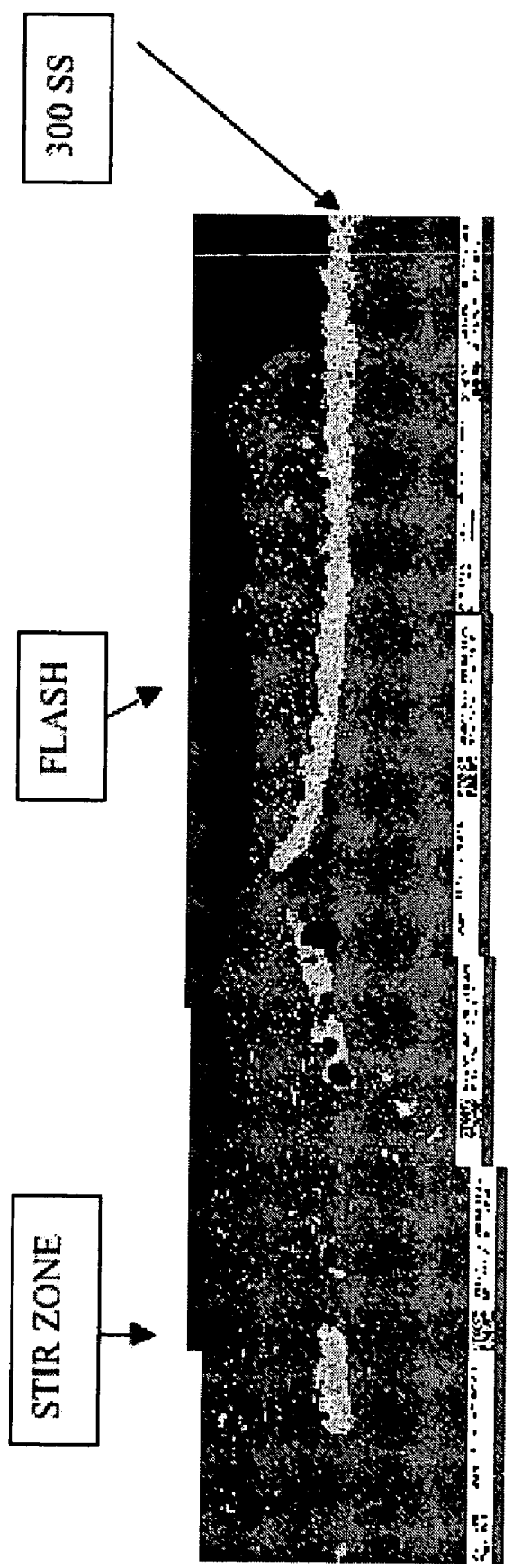
FIG. 5 is a cross-section of a substrate and surfactant processed according to an embodiment of the present disclosure.

During experimentation, in an effort to improve the wear and corrosion resistance of heat-treated aluminum alloys (e.g., 6061-T6), stainless steel (e.g., type 304) was two-wire electric arc sprayed (with atmospheric atomization) onto the aluminum substrate of flat geometry. Specialized surface preparation may not be needed, e.g., smooth as-rolled or as-cast, and was not employed during this experiment. Immediately following spraying, the non-consumable densification tool, was rotated in contacted with the coating. The tool cuts into the coating, transforming the porous coating into one with significantly improved density and bonding. This transformation occurs due to a combination of friction heating, mechanical wrinkling, rearrangement and microstructure kneading, leading to nano-microstructuring with the attendant enhancement of mechanical properties. DTSC processing can be repeated to improve bonding and coating density. FIG. 5 shows the preliminary results of Austenitic Stainless Steel on 6061 Aluminum.

Figure 6A:
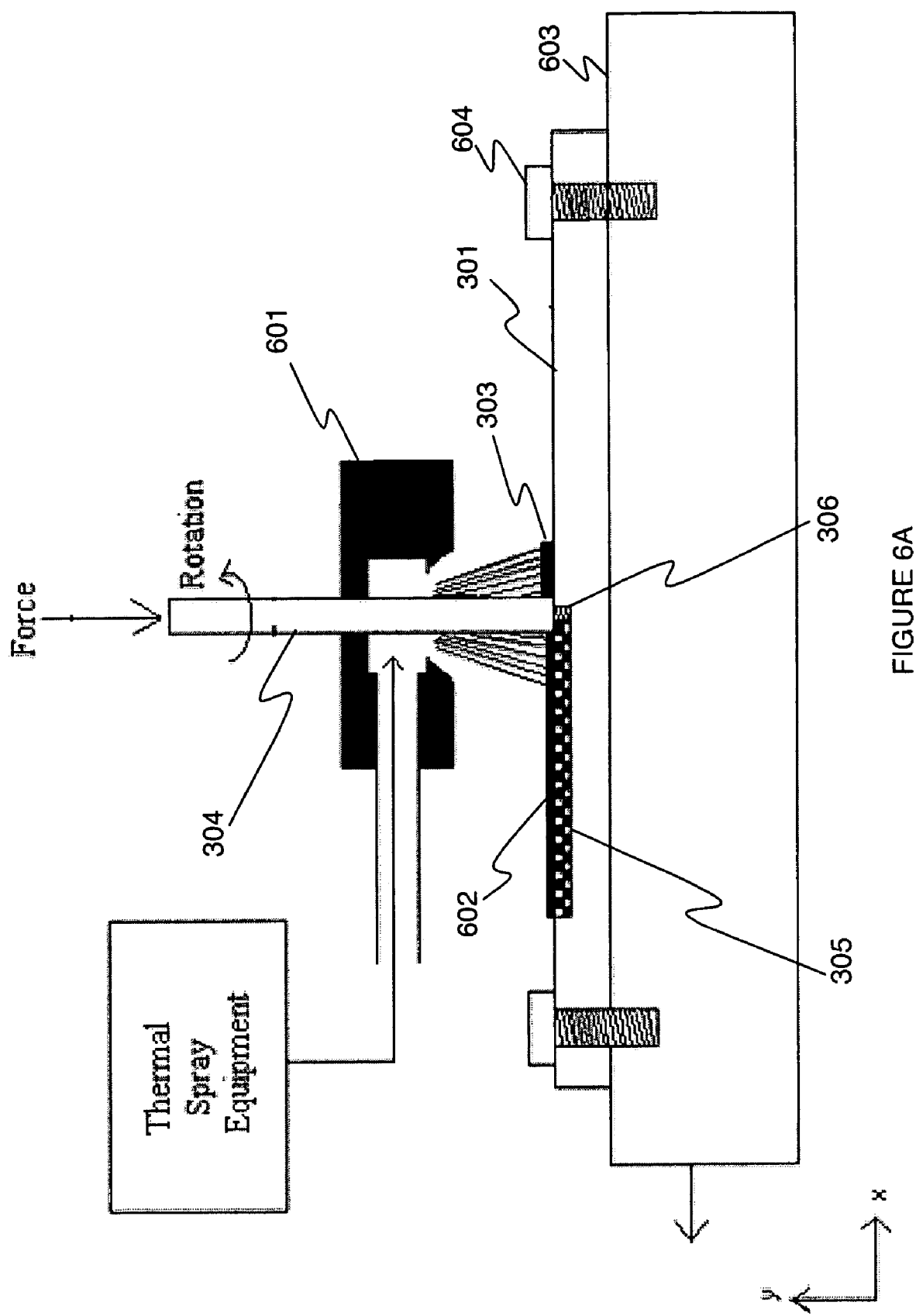

Referring to FIG. 6A, the friction stir welding tool 304 may be incorporated with the thermal spray gun 302 into an integrated device. The tool 304/306 passes through a mixing head and spray nozzle 601 of the thermal spray system. A portion of the thermal spray coating deposited before mixing 303 is worked into the substrate as a composite material 305. A portion of the thermal spray coating deposited after mixing 602 coating the composite material 305.

As shown in FIG. 6, the substrate 301 may be fixed to a stage 603 using bolts 604 or other suitable means such as a clamp or pins. The stage 603 may move under the thermal spray gun and friction stir welding tool, which may remain stationary.

Figure 6B:
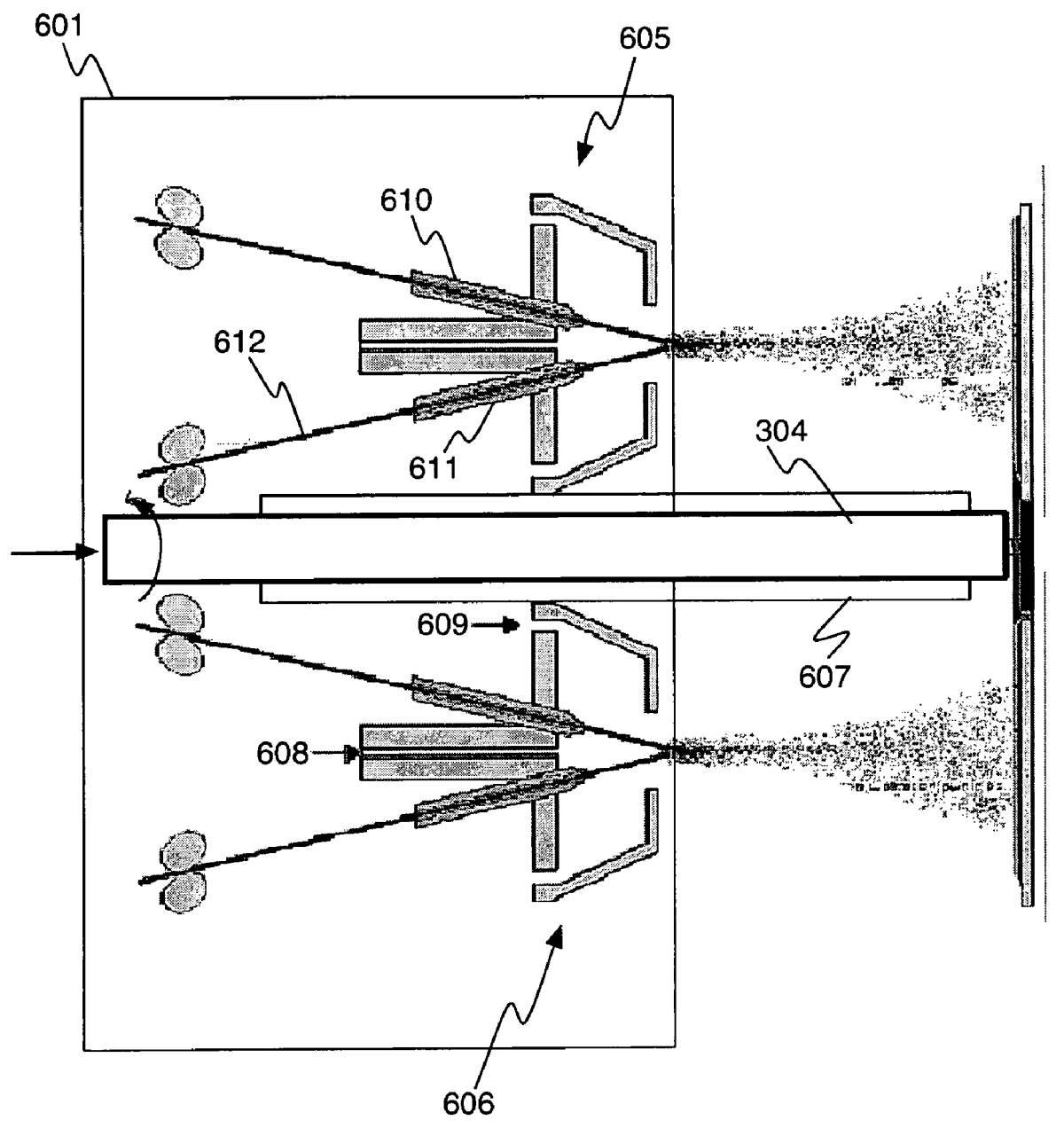

FIG. 6B is a view of the mixing head and spray nozzle 601 of FIG. 6A. The mixing head and spray nozzle 601 comprise multiple two-wire arc spray guns 605–606 surrounding a DTSC tool 304. The apparatus is flexible in that multiple plasma arc guns, multiple detonation guns, multiple two-wire arc sprayers or any combination thereof can be designed to spray a variety of coatings onto the substrate 301. A tube 607 protects the densification tool 304 from heat generated by the guns 605–606. The tubing 607 is, for example, a ceramic tube.

In FIG. 6B each two-wire arc spray gun 605–606 comprises a primary atomizing air inlet 608 and secondary air inlet 609. Two contact tubes or electrodes are provided, a first contact tube 610 has a positive charge, +VE, and a second tube 611 has a negative charge, –VE. A wire feedstock, e.g., 612, is provided through each contact tube. The contact tubes impart electric charges to the wire feedstock, which arc in front of the primary air inlet 608. Compressed gas is supplied through the atomizing air inlets to atomize and propel the wire feedstock surfacing material to the substrate.

Having described embodiments for a system and method for improving an interfacial bond between a thermal spray coating and a substrate, it is noted that modifications and variations can be made by persons skilled in the art in light of the above teachings. It is therefore to be understood that changes may be made in the particular embodiments of the invention disclosed which are within the scope and spirit of the invention.

What is claimed is:

1. A method for densification of a thermal spray coating comprising:
    depositing a thermal spray coating on a substrate; and
    mixing all the thermal spray coating and all the substrate by friction stir welding, forming a monolithic composite material consisting of the thermal spray coating and the substrate.

2. The method of claim 1, wherein the thermal spray coating is deposited by as a plasma spray.

3. The method of claim 1, wherein the thermal spray coating is deposited by oxy-fuel combustion acceleration of a powder feedstock.

4. The method of claim 1, wherein the thermal spray coating is deposited by two-wire electric arc spray.

5. The method of claim 1, wherein the substrate is a ferrous alloy.

6. The method of claim 1, wherein the substrate is a non-ferrous alloy.

7. The method of claim 1, wherein a thermal spray coating is a ceramic, a carbide, a metal, a composite, or a plastics.

8. The method of claim 1, further comprising determining a time between depositing the thermal spray coating and the friction stir welding according to a distance between a spray gun of a thermal spray system and a tool of a friction stir welding system and a speed of the substrate relative to the spray gun and tool.

9. The method of claim 1, further comprising depositing another thermal spray coating on the composite material, wherein the second thermal spray coating is not densified.

10. A method for densification of a thermal spray coating comprising:
    depositing a first thermal spray coating on a substrate;
    forming a monolithic composite material by mixing all the thermal spray coating and all the substrate by friction stir welding; and
    depositing a second thermal spray coating on the composite material, wherein the second thermal spray coating is not densified.

11. The method of claim 10, wherein the mixing causes metal flow of the first thermal spray coating to a depth controlled by a nib of a weld tool into the substrate.

* * * * *